(12) United States Patent
Hwang

(10) Patent No.: US 12,028,150 B2
(45) Date of Patent: Jul. 2, 2024

(54) COMMUNICATION CONTROL APPARATUS AND METHOD OF ARTIFICIAL SATELLITE

(71) Applicant: INDUSTRY-ACADEMIC COOPERATION FOUNDATION, CHOSUN UNIVERSITY, Gwangju (KR)

(72) Inventor: Suk-seung Hwang, Gwangju (KR)

(73) Assignee: Industry-Academic Cooperation Foundation, Chosun University, Gwangju (KR)

(*) Notice: Subject to any disclaimer, the term of this patent is extended or adjusted under 35 U.S.C. 154(b) by 321 days.

(21) Appl. No.: 17/455,774

(22) Filed: Nov. 19, 2021

(65) Prior Publication Data

US 2022/0239366 A1 Jul. 28, 2022

(30) Foreign Application Priority Data

Jan. 28, 2021 (KR) .................. 10-2021-0012561

(51) Int. Cl.
*H04B 7/185* (2006.01)

(52) U.S. Cl.
CPC ..... *H04B 7/18513* (2013.01); *H04B 7/18519* (2013.01)

(58) Field of Classification Search
CPC ............ H04B 7/18513; H04B 7/18519; H04B 7/18517; H04B 7/18515; G01S 19/30; G01S 19/23; G01S 3/14
See application file for complete search history.

(56) References Cited

U.S. PATENT DOCUMENTS

2008/0248811 A1\* 10/2008 Maloney ................. G01S 19/09
342/357.29

FOREIGN PATENT DOCUMENTS

JP 2007-518979 A 7/2007
WO WO-9802762 A2 \* 1/1998 ............. G01S 1/022

OTHER PUBLICATIONS

Ji-Youn Mun, Tae-Yun Kim, Young-Chul Bae, Suk-Seung Hwang, "Performance Evaluation of Satellite Beamforming System with Square Array Antenna", Dec. 5-8, 2018, IEEE, 1-4 (Year: 2018).\*

(Continued)

*Primary Examiner* — Farid Seyedvosoghi
(74) *Attorney, Agent, or Firm* — Knobbe, Martens, Olson & Bear, LLP

(57) ABSTRACT

A communication control apparatus and method of an artificial satellite are disclosed. The communication control apparatus includes a processor, a memory operatively connected to the processor, the memory being configured to store at least one piece of code to be executed by the processor, and a transmission and reception interface configured to communicate with a ground control center, wherein the memory stores code enabling the processor to receive location information of a signal generator on the ground from the ground control center, to calculate an angle of arrival for a target signal from the signal generator, received by the artificial satellite, based on the location information of the signal generator and location information of the ground control center, and to perform beamforming in a direction in which the artificial satellite detects the target signal based on the angle of arrival, when the code is executed by the processor.

18 Claims, 11 Drawing Sheets

(56) References Cited

OTHER PUBLICATIONS

Suk-seung Hwang (named inventor) and Se-Yen Kim, "Adaptive Beamformer Using Signal Location Information for Satellite", *Journal of Positioning, Navigation, and Timing*, 9(4), 379-385, 2020.

Suk-seung Hwang (named inventor) et al., "Adaptive Beamforming Satellite System Based on Signal Location", Korea Next Generation Computing Conference, 2020.

Office Action of the corresponding Korean Application No. 10-2021-0012561 dated Jun. 21, 2023.

Mun, Ji-Youn et al. "Adaptive Beamforming System Architecture Based on AOA Estimator." The Journal of the Korea Institute of Electronic Communication Sciences, vol. 12, No. 5, Oct. 31, 2017, pp. 777-782.

\* cited by examiner

FIG. 5A

Table 1. The received signal parameter for the first signal.

| Signal | Elevation (θ°) | Azimuth (Φ°) | Center frequency |
|---|---|---|---|
| CW1 | 120 | 12 | 0.1 |
| CW2 (desired) | 120 | 260 | 0.2 |
| CW3 | 120 | 93 | 0.4 |
| FM | 120 | 320 | 0.15 |
| AM | 120 | 85 | 0.32 |

FIG. 5B

Table 2. The received signal parameter for the second signal.

| Signal | Elevation (θ°) | Azimuth (Φ°) | Center frequency |
|---|---|---|---|
| CW | 210 | 330 | 0.3 |
| WB (desired) | 210 | 110 | 0.05 |
| FM | 210 | 197 | 0.2 |
| AM | 210 | 45 | 0.42 |

The received signal spectrum for the first signal.

The received signal spectrum for the second signal.

Relative signal coordinates for the first signal.

Relative signal coordinates for the second signal.

MVDR beam pattern for azimuth angle for the first signal (θ=120°)

MVDR beam pattern for azimuth angle for the second signal (θ=210°)

MVDR beamformer output spectrum for the first signal.

MVDR beamformer output spectrum for the second signal.

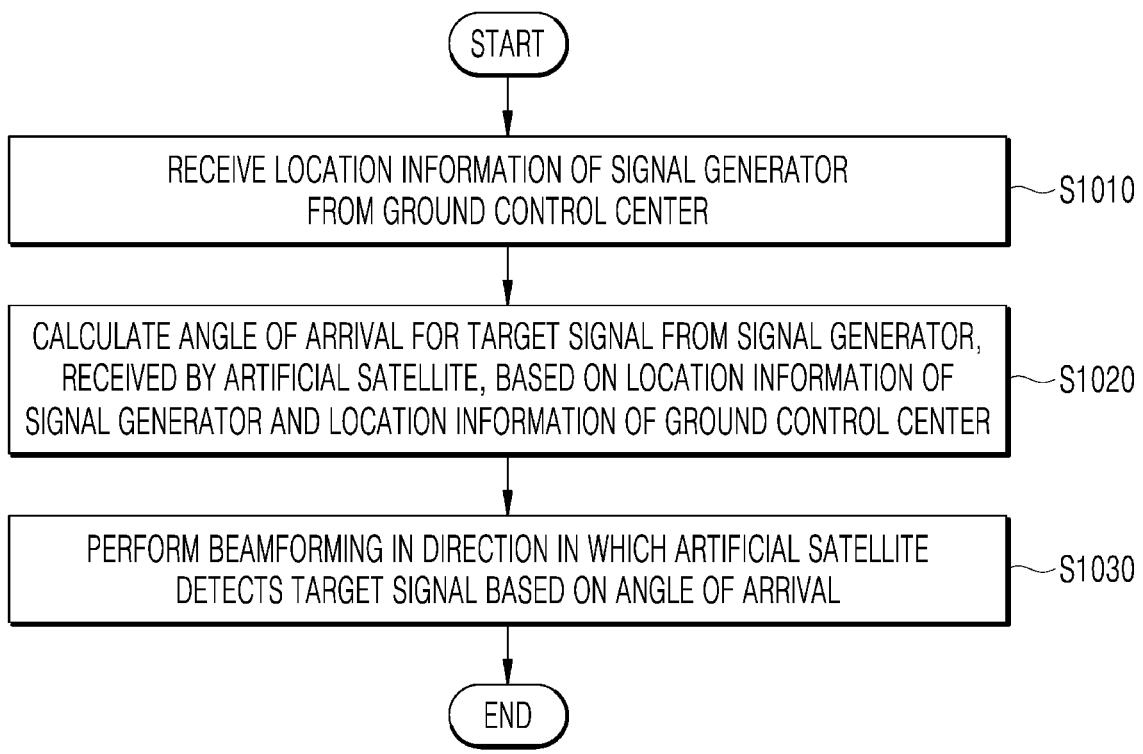

COMMUNICATION CONTROL APPARATUS AND METHOD OF ARTIFICIAL SATELLITE

STATEMENT REGARDING GOVERNMENT SUPPORT

The present disclosure was supported at least in part by the Ministry of Education of the South Korean government for research project, the title of which is DEVELOPMENT OF INTELLIGENT MODE SELECTION TECHNOLOGY FOR ADVANCEMENT IN POSITIONING PERFORMANCE OF UNMANNED VEHICLE (Project Number: 20200492) conducted by the Industry Academic Cooperation Foundation, Chosun University.

Also, the present disclosure was supported at least in part by the Ministry of Education of the South Korean government for research project, the title of which is RESEARCH ON HIGH-PERFORMANCE UNDERWATER LOCALIZATION TECHNOLOGY BASED ON ADAPTIVE SIGNAL PROCESSING (Project Number: 1345316044) conducted by the Industry Academic Cooperation Foundation, Chosun University.

Furthermore, the present disclosure was supported ta least in part by the Ministry of Science and ICT of the South Korean government for research project, the title of which is DEVELOPMENT OF DIGITAL INTELLIGENCE TWIN-BASED REAL-TIME NON-FACE-TO-FACE CARDIO-VASCULAR DISEASE PREDICTION AND MONITORING TECHNOLOGY (Project No. 1711193165) conducted by the Industry Academic Cooperation Foundation, Chosun University.

CROSS-REFERENCE TO RELATED APPLICATION

The present application claims the benefit of priority to Korean Patent Application No. 10-2021-0012561, entitled COMMUNICATION CONTROL APPARATUS AND METHOD OF ARTIFICIAL SATELLITE, filed on Jan. 28, 2021, in the Korean Intellectual Property Office, the entire disclosure of which is incorporated herein by reference.

BACKGROUND

Technical Field

The present disclosure relates to technology capable of enabling an artificial satellite to easily detect a target signal generated by a signal generator based on location information of the signal generator received from a ground control center.

Description of Related Technology

An artificial satellite requires an accurate angle of arrival (AOA) of a signal on the ground in order to efficiently receive the signal using a beamformer. The artificial satellite may estimate direction information of a signal using a high-resolution direction finding algorithm, such as multiple signal classification (MUSIC).

SUMMARY

It is an object of the present disclosure to enable an artificial satellite to calculate an angle of arrival of a signal on the ground, received by the artificial satellite, based on location information of a signal source (a signal generator that generates a signal) received from a ground control center, instead of the artificial satellite directly detecting the signal in order to calculate the angle of arrival of the signal, whereby it is possible for the artificial satellite to easily recognize the angle of arrival of the signal on the ground.

It is another object of the present disclosure to enable the artificial satellite to detect a signal on the ground based on the location information of the signal source (the signal generator that generates the signal) received from the ground control center upon determining that the signal generated on the ground is an abnormal signal, whereby it is possible for the artificial satellite to rapidly recognize an abnormal signal only when the abnormal signal is generated on the ground without continuously recognizing the signal on the ground.

It is another object of the present disclosure to enable the artificial satellite to detect a signal on the ground based on the location information of the signal source received from the ground control center upon determining that a signal detected in a predetermined area of interest of the artificial satellite is an abnormal signal, whereby it is possible for the artificial satellite to monitor only a signal generated in a specific area on the ground.

It is a further object of the present disclosure to enable the artificial satellite to calculate an angle of arrival of a signal, received by the artificial satellite, based on location information of a signal source provided by each of a plurality of ground control centers and signal intensity information of the signal upon determining that a signal generated on the ground is an abnormal signal when the artificial satellite communicates with the plurality of ground control centers, whereby it is possible to improve accuracy of the angle of arrival.

In order to accomplish the above objects, an embodiment of the present disclosure provides a communication control apparatus and method of an artificial satellite capable of enabling the artificial satellite to easily detect a target signal generated by a signal generator based on location information of the signal generator received from a ground control center.

Another embodiment of the present disclosure provides a communication control apparatus of an artificial satellite, the communication control apparatus including a processor, a memory operatively connected to the processor, the memory being configured to store at least one piece of code to be executed by the processor, and a transmission and reception interface configured to communicate with a ground control center, wherein the memory stores code enabling the processor to receive location information of a signal generator on the ground from the ground control center, to calculate an angle of arrival for a target signal from the signal generator, received by the artificial satellite, based on the location information of the signal generator and location information of the ground control center, and to perform beamforming in a direction in which the artificial satellite detects the target signal based on the angle of arrival, when the code is executed by the processor.

A further embodiment of the present disclosure provides a communication control method of an artificial satellite, the communication control method including receiving location information of a signal generator on the ground from a ground control center, calculating an angle of arrival for a target signal from the signal generator, received by the artificial satellite, based on the location information of the signal generator and location information of the ground control center, and performing beamforming in a direction in which the artificial satellite detects the target signal based on the angle of arrival.

Other aspects and features in addition to those described above will become clear from the accompanying drawings, claims, and the detailed description of the present disclosure.

BRIEF DESCRIPTION OF THE DRAWINGS

The above and other aspects, features, and advantages of the present disclosure will become apparent from the detailed description of the following aspects in conjunction with the accompanying drawings.

FIGS. 5A, 5B, 6A, 6B, 7A, 7B, 8A, 8B, 9A, and 9B are views illustrating a performance evaluation simulation example for the communication control apparatus of the artificial satellite according to the embodiment of the present disclosure.

FIG. 10 is a flowchart showing a communication control method of an artificial satellite according to an embodiment of the present disclosure.

DETAILED DESCRIPTION

Figure 1:
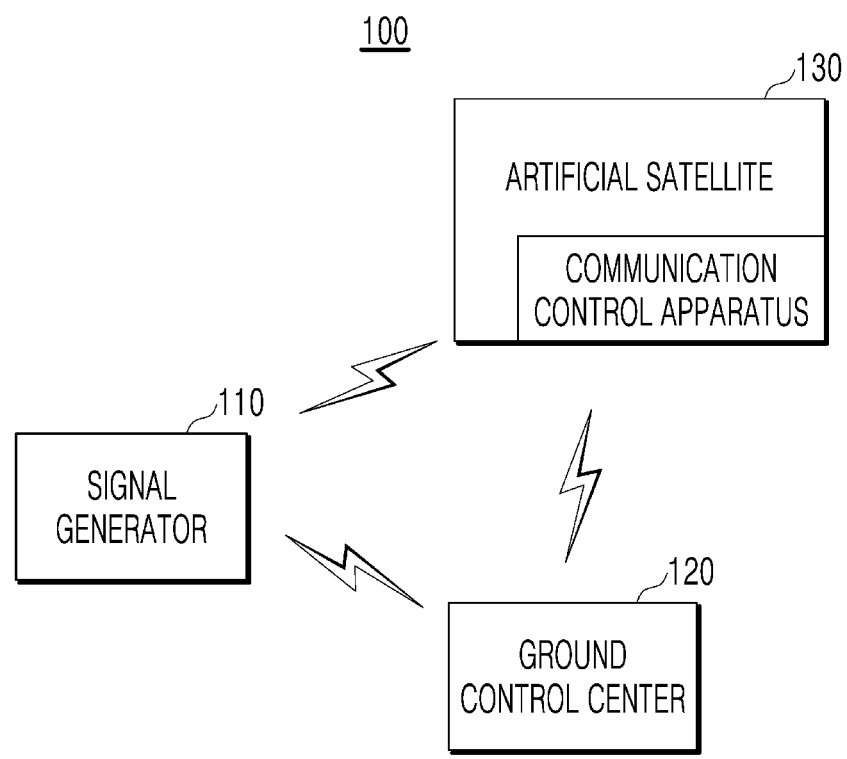
FIG. 1 is a view schematically showing an example of a communication environment of an artificial satellite according to an embodiment of the present disclosure.

Since the artificial satellite is located at a very high altitude of about 250 to 36,000 km, however, the intensity of a signal that reaches the artificial satellite is generally very low. In addition, it is difficult for the artificial satellite to accurately estimate the angle of arrival due to effects of various ionospheres of the earth, weather change, such as rain, and the number of insufficient antenna elements used in a limited area of the artificial satellite. That is, it is very difficult for the artificial satellite to accurately estimate the angle of arrival in a satellite situation in which considerable distance, low signal power, and high power interference must be considered.

As a result, it is not easy for the artificial satellite to accurately receive a signal on the ground from which the angle of arrival cannot be recognized.

The advantages and features of the present disclosure and methods of achieving the same will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents, and alternatives falling within the spirit and scope of the present disclosure. The embodiments disclosed below are provided so that this disclosure will be thorough and complete and will fully convey the scope of the present disclosure to those skilled in the art. In the following description of embodiments of the present disclosure, a detailed description of related known technology will be omitted when the same may obscure the subject matter of the embodiments of the present disclosure.

The terminology used herein is used for the purpose of describing particular example embodiments only and is not intended to be limiting. It must be noted that as used herein and in the appended claims, the singular forms include the plural forms unless the context clearly dictates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. Furthermore, terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

In the present disclosure, a "target signal" may mean a signal that is determined to be an abnormal signal and becomes an object to be detected by an artificial satellite, among signals generated by a signal generator.

FIG. 1 is a view schematically showing an example of a communication environment of an artificial satellite according to an embodiment of the present disclosure.

Referring to FIG. 1, the communication environment 100 of the artificial satellite according to the embodiment of the present disclosure may include a signal generator 110, a ground control center 120, and an artificial satellite 130.

The signal generator 110 may be located on the ground, and may generate a signal.

The ground control center 120 may sense the signal generated by the signal generator 110, may estimate the location of the signal generator 110, and may generate location information. At this time, upon determining that the signal is an abnormal signal based on predetermined criteria (e.g. a predetermined frequency, the magnitude of the frequency, the shape of the frequency, and a signal generation duration), the ground control center 120 may transmit the location information of the signal generator 110 to the artificial satellite 130.

The artificial satellite 130 may include a communication control apparatus 131, and may control communication with the signal generator 110 and the ground control center 120 through the communication control apparatus 131.

The artificial satellite 130 may receive the location information of the signal generator 110 from the ground control center 120 under control of the communication control apparatus 131, and may detect the signal generated by the signal generator 110 based on the location information of the signal generator 110. At this time, the communication control apparatus 131 in the artificial satellite 130 may calculate an angle of arrival for the signal from the signal generator 110 based on the location information of the signal generator 110, and may control a beamformer (not shown) in the artificial satellite 130 based on the angle of arrival, whereby it is possible to detect the signal generated by the signal generator 110.

In consideration of the fact that it is not easy to acquire a signal transmitted by a ground device having unknown location information, the artificial satellite 130 may not directly estimate the location of the signal generator 110, and may receive first the location information of the signal generator 110 from the ground control center 120, may calculate an angle of arrival for the signal based on the received location information of the signal generator 110, and may detect the signal from the signal generator 110 based on the angle of arrival, whereby it is possible to easily and accurately acquire a signal on the ground.

Figure 2:
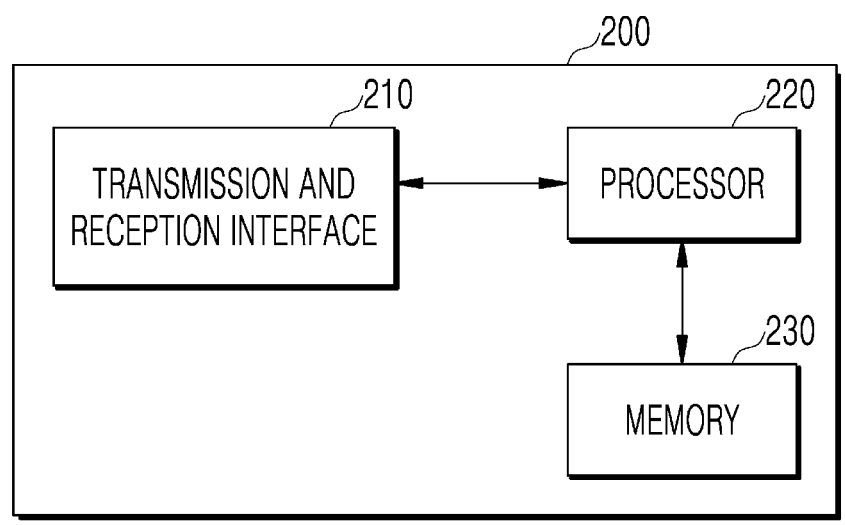
FIG. 2 is a view schematically showing an example of the construction of a communication control apparatus of an artificial satellite according to an embodiment of the present disclosure.
Figure 3:
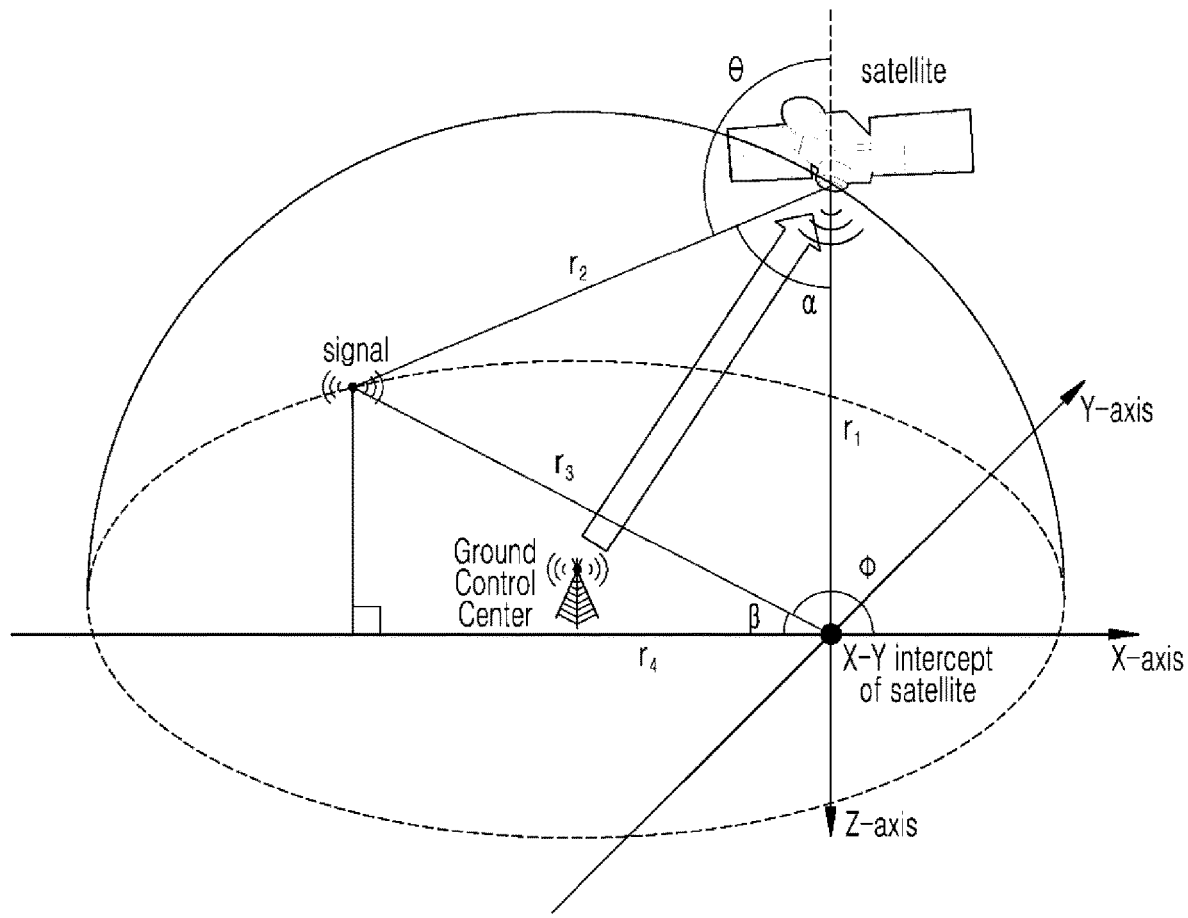
FIG. 3 is a view illustrating an elevation angle and an azimuth angle as an angle of arrival calculated by the communication control apparatus of the artificial satellite according to the embodiment of the present disclosure.

FIG. 2 is a view schematically showing an example of the construction of a communication control apparatus of an artificial satellite according to an embodiment of the present disclosure. In addition, FIG. 3 is a view illustrating an elevation angle and an azimuth angle as an angle of arrival calculated by the communication control apparatus of the artificial satellite according to the embodiment of the present disclosure.

Referring to FIG. 2, the communication control apparatus 200 of the artificial satellite may include a transmission and reception interface 210, a processor 220, and a memory 230.

The transmission and reception interface 210 may communicate with the ground control center. Upon determining that the signal generated by the signal generator is an abnormal signal based on the predetermined criteria, the transmission and reception interface 210 may receive the location information of the signal generator from the ground control center. At this time, when not satisfying the predetermined criteria (e.g. the predetermined frequency, the magnitude of the frequency, the shape of the frequency, and the signal generation duration), the signal may be determined to be an abnormal signal. The determination as to whether the signal is an abnormal signal may be made by the ground control center. However, the present disclosure is not limited thereto. For example, the determination as to whether the signal is an abnormal signal may be made by the processor 220 in the communication control apparatus 200 of the artificial satellite. In addition, as an example, when the result of determination as to whether the signal is an abnormal signal by the ground control center and the result of determination as to whether the signal is an abnormal signal by the processor are different from each other, whether the transmission and reception interface 210 receives the location information of the signal generator may be determined based on the result of determination as to whether the signal is an abnormal signal by the ground control center.

The ground control center, which provides the location information of the signal generator to the artificial satellite, may estimate the location information of the signal generator using various location estimation methods, such as time of arrival (TOA) trilateration and time difference of arrival (TDOA).

As another example, the processor 220 may determine whether a signal detected in a predetermined area of interest of the artificial satellite is an abnormal signal based on predetermined criteria (e.g. the predetermined frequency, the magnitude of the frequency, the shape of the frequency, and the signal generation duration), and, upon determining that the detected signal is an abnormal signal, may request the location information of the signal generator, which is a signal source of the abnormal signal, from the ground control center. That is, the processor 220 may monitor whether a signal generated in a specific area (or a specific country) is an abnormal signal, and, upon determining as the result of monitoring that the signal is an abnormal signal, may request the location information of the signal generator, which is a signal source of the abnormal signal, from the ground control center. Here, the determination as to whether the signal is an abnormal signal may be made by the processor 220 in the communication control apparatus 200 of the artificial satellite. However, the present disclosure is not limited thereto. The determination as to whether the signal is an abnormal signal may be made by the ground control center.

In the embodiment, detection of a signal on the ground may be performed by the ground control center or the processor 220 in the communication control apparatus 200 of the artificial satellite. When the signal on the ground is periodically detected by the ground control center, the processor 220 may not continuously detect the signal on the ground and may detect the signal on the ground as a target signal only when the signal on the ground detected by the ground control center is an abnormal signal, whereby unnecessary operation of the artificial satellite may be omitted, and therefore energy consumption related thereto may be reduced.

Upon determining that the signal generated by the signal generator is an abnormal signal based on the predetermined criteria or as the result of requesting the location information of the signal generator on the ground from the ground control center, the processor 220 may receive the location information of the signal generator on the ground from the ground control center. The processor 220 may calculate an angle of arrival for a target signal from the signal generator, received by the artificial satellite, based on the location information of the signal generator and location information of the ground control center. The location information of the ground control center may be stored in advance in the memory 230.

As shown in FIG. 3, the angle of arrival for the target signal may be represented by an elevation angle θ and an azimuth angle φ for the target signal.

Here, the location information of the signal generator may include a first location within a two-dimensional coordinate system having the location of the ground control center as a first origin. At this time, the two-dimensional coordinate system may be a two-dimensional coordinate system having a line that joins the first origin and a projected point of the artificial satellite on the ground, which is the position at which the artificial satellite is projected onto the ground, as an X axis and a line perpendicular to the X axis on the ground as a Y axis. Here, the two-dimensional coordinate system may be matched with an X-Y plane having the ground control center as a basis (the origin) without consideration of an elevation (Z) axis. In addition, the two-dimensional coordinate system may be formed based on the elevation of the signal generator and the elevation of the ground control center.

The processor 220 may convert the first location into a second location within a three-dimensional coordinate system having the current projected point of the artificial satellite on the ground as a second origin based on the location information of the ground control center and the current location of the artificial satellite, and may calculate an elevation angle for the target signal. Here, the three-dimensional coordinate system may be a three-dimensional coordinate system having a line that joins the current projected point of the artificial satellite on the ground and the location of the ground control center as an X axis, a line perpendicular to the X axis on the ground as a Y axis, and a line that joins the second origin and the artificial satellite as a Z axis.

The elevation angle for the target signal may be determined based on the distance $r_1$ between the artificial satellite and the second origin, the distance $r_2$ between the signal generator and the artificial satellite, and the distance $r_3$ between the signal generator and the projected point of the artificial satellite on the ground.

In order to calculate the elevation angle for the target signal, first, the processor 220 may calculate the distance $r_1$ between the artificial satellite and the second origin, the distance $r_2$ between the signal generator and the artificial satellite, and the distance $r_3$ between the signal generator and the projected point of the artificial satellite on the ground using Mathematical Expression 1.

$$r=\sqrt{(x_1-x_2)^2+(y_1-y_2)^2} \qquad \text{[Mathematical Expression 1]}$$

Here, r may mean the distance between two arbitrary coordinates $(x_1, y_1)$ and $(x_2, y_2)$.

Subsequently, the processor 220 may calculate the elevation angle θ (90 to 270) for the target signal based on the location information of the signal generator using, for example, Mathematical Expression 2, which is the second hyperbolic law of cosines, and Mathematical Expression 3. At this time, the processor 220 may calculate a contained angle between the distance $r_1$ between the artificial satellite and the second origin and the distance $r_2$ between the signal generator and the artificial satellite, and may calculate the elevation angle for the target signal based on the contained angle.

$$\alpha = \cos^{-1}\left(\frac{r_1^2+r_2^2-r_3^2}{2r_1r_2}\right)(0° < \alpha < 90°) \qquad \text{[Mathematical Expression 2]}$$

$$\theta = 180 - \alpha \quad (90° < \theta < 180°) \qquad \text{[Mathematical Expression 3]}$$

$$\theta = 180 + \alpha \quad (180° < \theta < 270°)$$

In the Mathematical Expression 2, α is a contained angle between $r_1$ and $r_2$ necessary to calculate the elevation angle θ, as shown in FIG. 3. In addition, $r_1$ is the distance between the artificial satellite and coordinates of the artificial satellite projected in an X-Y plane (projected coordinates of the artificial satellite in the X-Y plane), $r_2$ is the distance between the signal source and the artificial satellite, and $r_3$ is the distance between the signal source and the coordinates of the artificial satellite projected in the X-Y plane (the current projected point of the artificial satellite on the ground). Here, the X-Y plane may be a plane including a coordinate system having the projected coordinates of the artificial satellite in the X-Y plane having the origin shifted from the coordinate system having the location of the ground control center as the origin.

In addition, the processor 220 may calculate the azimuth angle for the target signal. At this time, the processor 220 may calculate the azimuth angle using Mathematical Expression 4, which is the trigonometric ratio law, and Mathematical Expression 5.

$$\beta = \cos^{-1}\left(\frac{r_4}{r_3}\right) \qquad \text{[Mathematical Expression 4]}$$

Here, $r_4$ is the distance between the intersection point between plane coordinates of the signal source and the X axis when the plane coordinates of the signal source are projected on the X axis and the projected coordinates of the artificial satellite in the X-Y plane, as shown in FIG. 3.

$$\phi = \begin{cases} \beta & (0° < \phi < 90°) \\ 180 - \beta & (90° < \phi < 180°) \\ 180 + \beta & (180° < \phi < 270°) \\ 180 - \beta & (270° < \phi < 360°) \end{cases} \qquad \text{[Mathematical Expression 5]}$$

When the angle of arrival for the target signal is calculated, the processor 220 may perform beamforming in a direction in which the artificial satellite detects the target signal based on the angle of arrival, whereby the artificial satellite may receive the target signal.

The processor 220 may extract a desired signal from the target signal based on the angle of arrival. Specifically, when beamforming is performed in the direction in which the artificial satellite detects the target signal based on the angle of arrival, the beamformer in the artificial satellite may form a beam in a direction corresponding to the location information of the signal generator based on the angle of arrival, and the processor 220 may form a null in a direction different from the direction corresponding to the location information of the signal generator, whereby the processor 220 may remove an interference signal and noise from the target signal through the beamformer, thereby extracting a desired signal from the target signal. At this time, the beamformer in the artificial satellite is initially set to form a beam in a direction corresponding to the location of the stationary ground control center, the beamformer forms a beam in the direction corresponding to the location of the signal generator, and the processor 220 forms a null in the direction corresponding to the location of the ground control center. That is, the processor 220 may adjust the direction of the beam set to face the ground control center so as to face the signal generator.

In the embodiment, the artificial satellite may be configured to communicate with a plurality of ground control centers. When the artificial satellite communicates with the plurality of ground control centers, the processor 220 may determine whether a signal detected in a predetermined area of interest of the artificial satellite is an abnormal signal based on the predetermined criteria. At this time, upon determining that the detected signal is an abnormal signal, the processor 220 may estimate a possible area in which a signal source of the detected signal may be located, and may request location information of the signal generator, which is the signal source of the abnormal signal, from a first ground control center that is located closest to the middle point of the area, among the plurality of ground control centers. That is, the processor 220 may acquire the location information of the signal generator through a ground control center capable of the most rapidly and accurately recognizing a signal in the area.

As another example, when the artificial satellite communicates with the plurality of ground control centers, the processor 220 may determine whether a signal detected in a predetermined area of interest of the artificial satellite is an abnormal signal based on the predetermined criteria. At this time, upon determining that the detected signal is an abnormal signal, the processor 220 may estimate a possible area in which a signal source of the detected signal may be located, and may request location information of the signal generator, which is the signal source of the abnormal signal, and signal intensity information of the abnormal signal from a first ground control center that is located closest to the middle point of the area and a second ground control center that is located second closest to the middle point of the area, among the plurality of ground control centers. The processor 220 may calculate the angle of arrival for the target signal from the signal generator, received by the artificial satellite, using at least one of the location information of the signal generator received from the first ground control center and the location information of the signal generator received from the second ground control center based on the signal intensity information of the abnormal signal included in the information received from the first ground control center and the second ground control center. At this time, the processor 220 may calculate the angle of arrival for the target signal using the location information of the signal generator having greater signal intensity, which is one of the location information of the signal generator received from the first ground control center and the location information of the signal generator received from the second ground control center. Alternatively, when both the signal intensities of two pieces of the location information are equal to or greater than a critical value, the processor 220 may mix the two pieces of the location information with each other to determine the location information, and may calculate the angle of arrival for the target signal using the determined location information. In addition, when the signal intensity of one piece of the location information is less than the critical value, the processor 220 may calculate the angle of arrival for the target signal using the other piece of the location information.

The memory 230 may be operatively connected to the processor 220, and may store at least one piece of code to be executed by the processor 220. In addition, the memory 230 may store the location information of the ground control center, and may update the location information of the ground control center upon receiving an update request.

Figure 4:
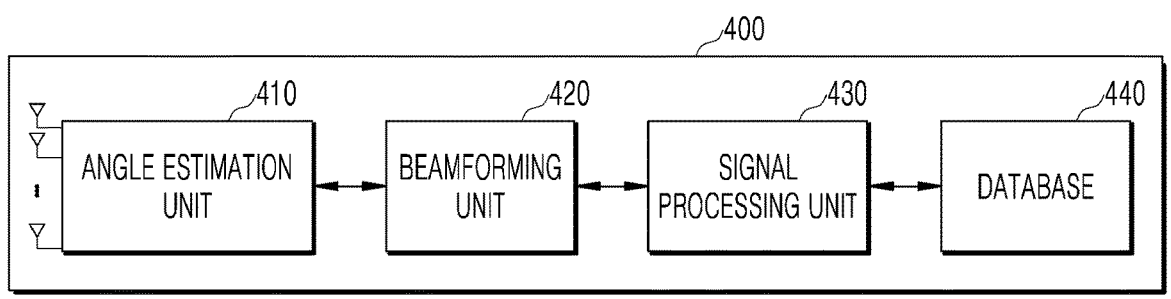
FIG. 4 is a view schematically showing another example of the construction of the communication control apparatus of the artificial satellite according to the embodiment of the present disclosure.

FIG. 4 is a view schematically showing another example of the construction of the communication control apparatus of the artificial satellite according to the embodiment of the present disclosure.

Referring to FIG. 4, the communication control apparatus 400 of the artificial satellite may include an angle estimation unit 410, a beamforming unit 420, a signal processing unit 430, and a database 440. Here, the angle estimation unit 410, the beamforming unit 420, and the signal processing unit 430 may correspond to the processor of FIG. 2.

The angle estimation unit 410 may calculate the angle of arrival for the target signal generated by the signal generator based on the location of the signal generator received from the ground control center. At this time, the ground control center may estimate the location information of the signal generator using various location estimation methods, such as time of arrival (TOA) trilateration and time difference of arrival (TDOA).

The angle estimation unit 410 may calculate direction information from the signal generator to the artificial satellite using, for example, the second hyperbolic law of cosines and the trigonometric ratio law.

Specifically, the angle estimation unit 410 may calculate the elevation angle θ (90 to 270) for the target signal, which is a component of the angle of arrival for the target signal based on the location information of the signal generator, using Mathematical Expression 1, Mathematical Expression 2, and Mathematical Expression 3.

At this time, the angle estimation unit 410 may check the position of the artificial satellite projected in an X-Y plane having the location of the ground control center as the origin, and may calculate the elevation angle for the target signal, as the angle of arrival, based on the angle α between a first straight line that joins the location of the artificial satellite and the projected position of the artificial satellite and a second straight line that joins the location of the artificial satellite and the location of the signal generator. Here, the X-Y plane may be a coordinate plane having the ground control center as a basis without consideration of an elevation (Z) axis.

Specifically, the angle estimation unit 410 may calculate the distance $r_1$ of the first straight line, the distance $r_2$ of the second straight line, and the distance $r_3$ of a third straight line that joins the location of the signal generator and the projected position of the artificial satellite, and may calculate the angle between the first straight line and the second straight line (the contained angle between the first straight line and the second straight line) based on the distance $r_1$ of the first straight line, the distance $r_2$ of the second straight line, and the distance $r_3$ of the third straight line. At this time, the angle estimation unit 410 may convert coordinates in the X-Y plane such that the projected position of the artificial satellite becomes the origin. As a result, projected coordinates of the artificial satellite, coordinates of the artificial satellite, and coordinates of the signal generator may be converted, whereby coordinates may be reset based on the artificial satellite. The angle estimation unit 410 may calculate the distance of the first straight line, the distance of the second straight line, and the distance of the third straight line based on the converted projected coordinates of the artificial satellite, the converted coordinates of the artificial satellite, and the converted coordinates of the signal generator.

In addition, the angle estimation unit 410 may calculate the azimuth angle for the target signal, which is another component of the angle of arrival for the target signal. At this time, the angle estimation unit 410 may calculate the azimuth angle ϕ for the target signal using Mathematical Expression 4 and Mathematical Expression 5.

The beamforming unit 420 may remove an interference signal and noise from the target signal based on the angle of arrival, whereby the beamforming unit 420 may extract a desired signal from the target signal. Specifically, the beamforming unit 420 may be, for example, a minimum variance distortionless response (MVDR) beamformer, and may form a beam in a direction corresponding to the location information of the signal generator based on the angle of arrival while forming a null in a direction different from the direction corresponding to the location information of the signal generator, whereby the beamforming unit 420 may remove an interference signal and noise from the target signal.

The beamforming unit 420 may calculate a weight vector $w_{mvdr}$ of MVDR using Mathematical Expression 6 based on an array response vector having the angle of arrival for the desired signal applied thereto.

$$W_{mvdr}=(a_x R^{-1} a_x)^{-1} R^{-1} a_r \quad \text{[Mathematical Expression 6]}$$

$R=E[h(k)h^H(k)]$ is a covariance matrix for a received signal vector. The output of the beamforming unit 420 including only a desired signal and noise as the result of removal of interference is represented by Mathematical Expression 7.

$$y_{mvdr}(k)=w_{mvdr}{}^H h(k) \quad \text{[Mathematical Expression 7]}$$

Here, H means conjugate transpose.

After beamforming by the beamforming unit 420, the angle estimation unit 410 may receive a target signal generated by the signal generator through, for example, an array antenna having M (M=Q×P) antenna elements. Here, the target signal may include a desired signal, a plurality of interference signals, and noise.

A target signal vector for index k may be represented by Mathematical Expression 8.

$$h(k)=a_x x(k)+Ar(k)+n(k) \quad \text{[Mathematical Expression 8]}$$

Here, h(k) is a target signal vector having a size of M, and $a_x$ is an array response vector having a size of M for a desired signal x(k). A is an array response matrix having a size of M×N for a plurality of interference signals, and each column of A is an array response vector for each interference signal. A may be represented by Mathematical Expression 9.

[Mathematical Expression 6]

$$A \triangleq \begin{bmatrix} 1 & \cdots & 1 \\ e^{-j\tau_1} & \cdots & e^{-j\tau_N} \\ \vdots & \ddots & \vdots \\ e^{-j(Q-1)\tau_1} & \cdots & e^{-j(Q-1)\tau_N} \\ e^{-jy_1} & \cdots & e^{-jy_N} \\ e^{-j(\tau_1+y_1)} & \cdots & e^{-j(\tau_N+y_N)} \\ \vdots & \ddots & \vdots \\ e^{-j((Q-1)\tau_1+(P-1)y_1)} & \cdots & e^{-j((Q-1)\tau_N+(P-1)y_N)} \end{bmatrix}$$

Here, $\tau_1 \triangleq 2\Pi(d/\lambda)\sin\theta_1\cos\phi_1$, $\gamma_1 \triangleq 2\Pi(d/\lambda)\sin\theta_1\cos\phi_1$, r(k) is an interference signal vector having a size of N (the number of interference signals), and n(k) is an additive white Gaussian noise (AWGN) vector that has independent identically distributed (i.i.d) characteristics and that has a size of M. In addition, $\theta_1$ and $\phi_1$ indicate an elevation angle and an azimuth angle of a first signal, respectively, and it is assumed that each element of n(k) has an average of "0" and a variance of "$\sigma^2$".

The signal processing unit 430 may process the signal output from the beamforming unit 420 using a predetermined processing method, and may store the same in the database 440.

The database 440 may store the signal processed by the signal processing unit 430.

Figure 6A:
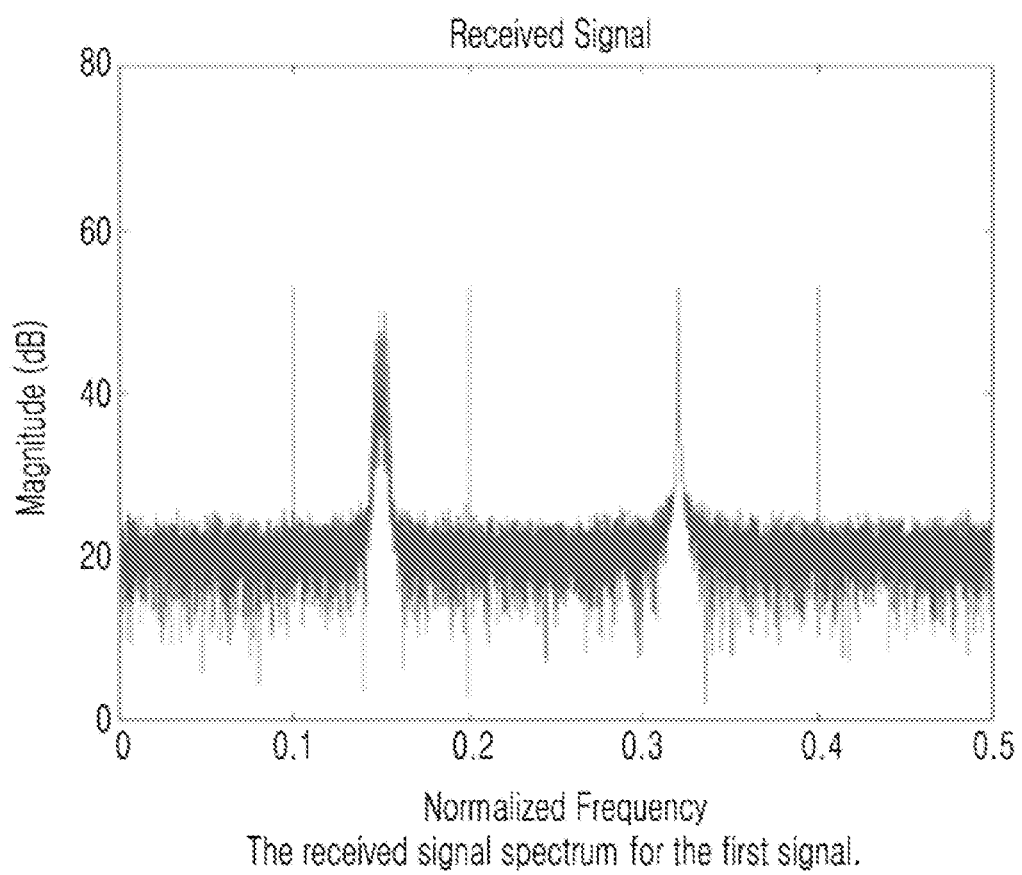
Figure 6B:
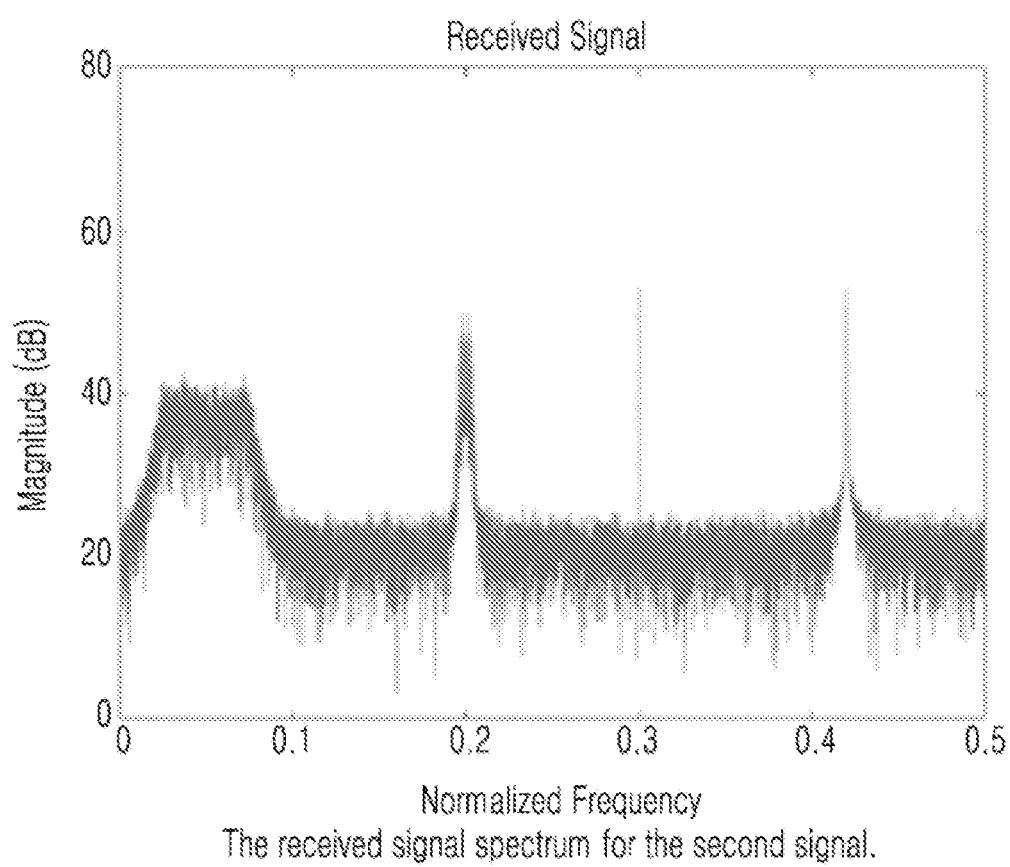
Figure 7A:
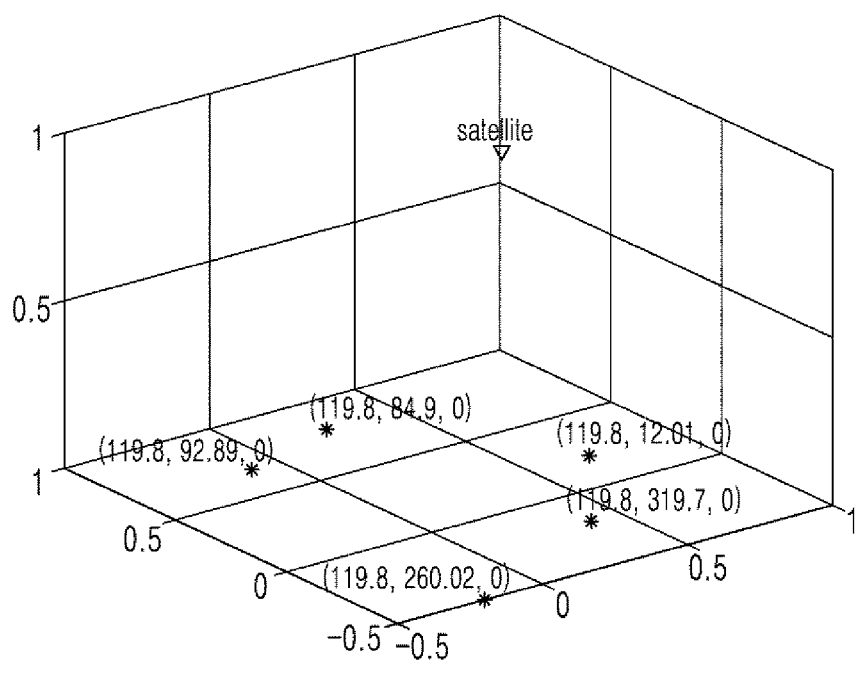
Figure 7B:
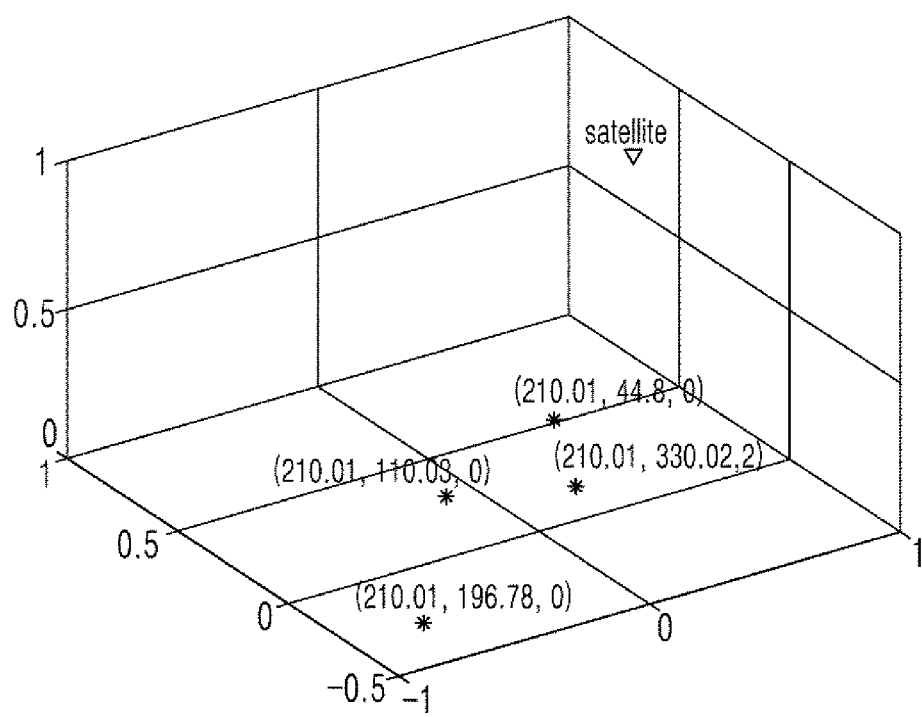
Figure 8A:
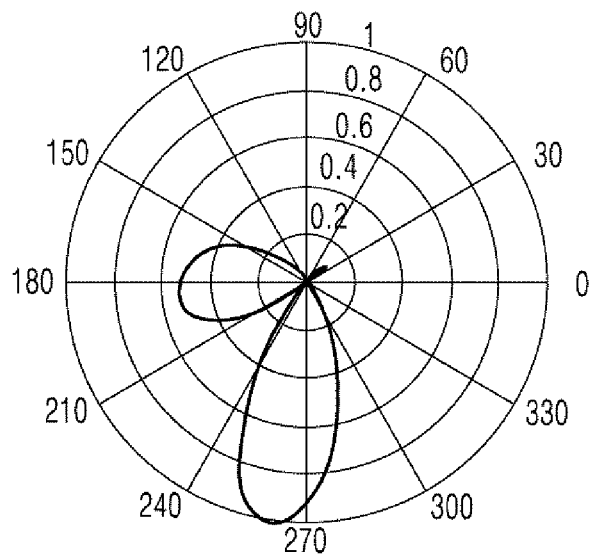
Figure 8B:
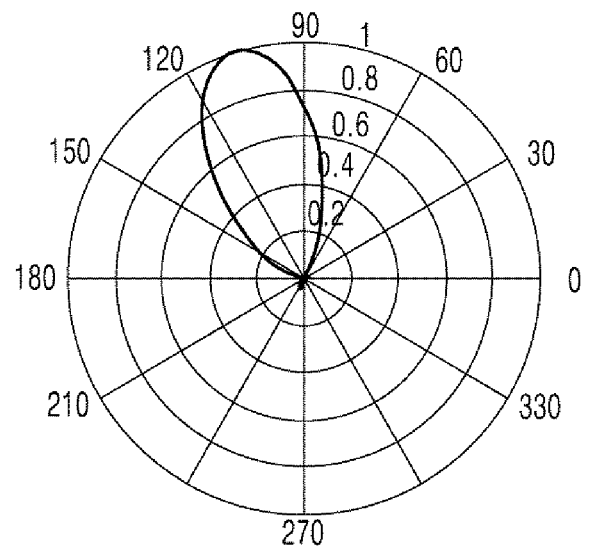
Figure 9A:
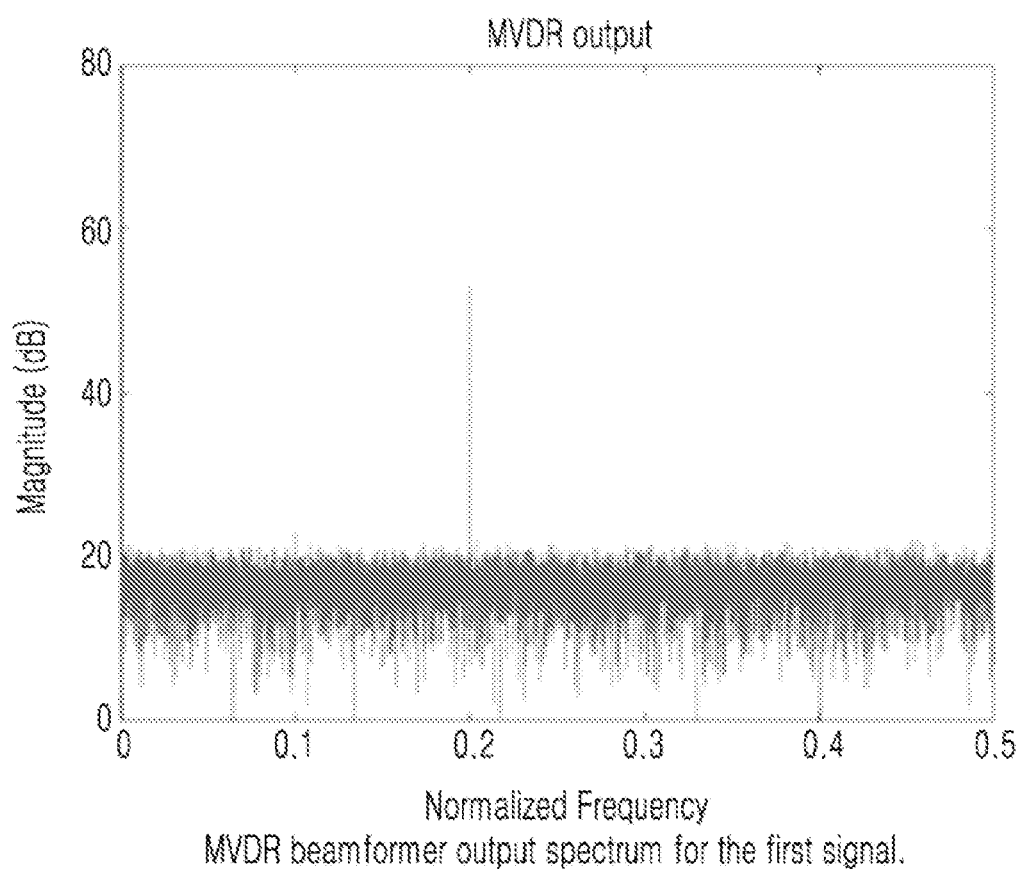
Figure 9B:
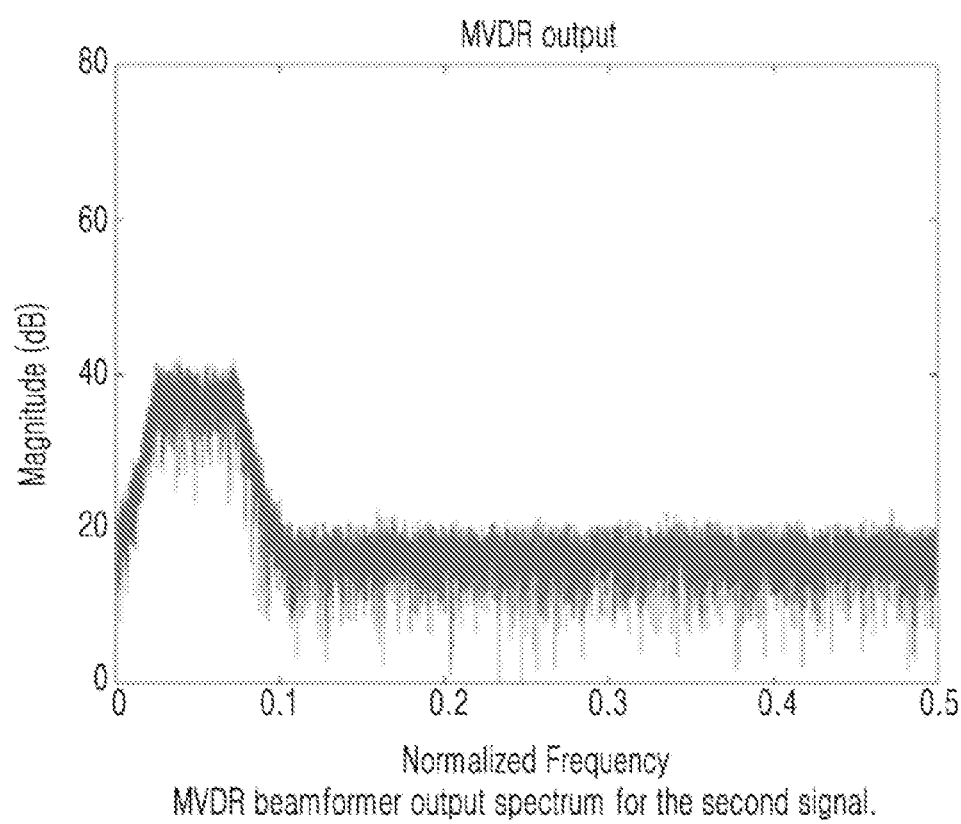

FIGS. 5A, 5B, 6A, 6B, 7A, 7B, 8A, 8B, 9A, and 9B are views illustrating a performance evaluation simulation example for the communication control apparatus of the artificial satellite according to the embodiment of the present disclosure. Specifically, FIG. 5A is a view showing information of first target signals, FIG. 5B is a view showing information of second target signals, FIG. 6A is a view showing spectra of the first target signals, FIG. 6B is a view showing spectra of the second target signals, FIG. 7A is a view showing the location of each signal included in the first target signals received from the ground control center and FIG. 7B is a view showing the location of each signal included in the second target signals received from the ground control center. In addition, FIG. 8A is a view showing a radiation angle beam pattern for a beamformer when the artificial satellite receives the first target signals, FIG. 8B is a view showing a radiation angle beam pattern for a beamformer when the artificial satellite receives the second target signals, FIG. 9A is a view showing spectra for the output of the beamformer when the artificial satellite receives the first target signals and FIG. 9B is a view showing spectra for the output of the beamformer when the artificial satellite receives the second target signals.

Referring to FIG. 5A and FIG. 5B, information of the first target signal transmitted to the artificial satellite is as shown in Table 1, and information of the second target signal transmitted to the artificial satellite is as shown in Table 2. It is assumed that the first target signal includes one desired signal CW2 (Continuous Wave 2), four interference signals CW1, CW2, FM (Frequency Modulation), and AM (Amplitude Modulation), and noise. It is assumed that the actual signal-to-noise ratio (SNR) of each signal is 20 dB, and parameters for each signal are as shown in Table 1. The spectrum of the first target signal in the frequency domain is as shown in FIG. 6A.

In addition, it is assumed that the second target signal includes one desired signal WB (Wideband), three interference signals CW, FM, and AM, and noise. It is assumed that the SNR of each signal is 20 dB, and parameters for each signal are as shown in Table 2. The spectrum of the second target signal in the frequency domain is as shown in FIG. 6B.

Meanwhile, when the first target signal is estimated by the ground control center, relative coordinates (normalized coordinates) of each signal in the estimated first target signal to the artificial satellite may be (−0.1, 0.68, 0), (0.41, −0.23, 0), or (0.25, 0.83, 0) upon assuming that coordinates of the artificial satellite are (0.66, 0.545, 0.81) and coordinates of the ground control center are (0, 0, 0).

When the artificial satellite receives the relative coordinates of each signal in the first target signal to the artificial satellite from the ground control center, the communication control apparatus of the artificial satellite may calculate (119.8°, 12.01°), (119.8°, 260.02°), (119.8°, 92.89°), (119.8°, 319.7°), or (119.8°, 84.9°) as the elevation angle and the azimuth angle of each signal using Mathematical Expression 1 to Mathematical Expression 5 based on the relative coordinates of each signal in the first target signal to the artificial satellite from the ground control center, as shown in FIG. 7A. At this time, the coordinates of the ground control center, as the origin, may be shifted to the point of the artificial satellite projected in the X-Y plane, all of the coordinates may be reset, and the elevation angle and the azimuth angle of each signal may be calculated. It can be seen that there is no great difference between the calculated elevation angle and azimuth angle of each signal and the elevation angle and the azimuth angle of each actual signal shown in Table 1.

In addition, when the second target signal is estimated by the ground control center, relative coordinates (normalized coordinates) of each signal in the estimated second target signal to the artificial satellite may be (0.3, 0.170), (−0.11, 0.34, 0), (−0.71, −0.27, 0), or (0.52, 0.52, 0) upon assuming that coordinates of the artificial satellite are (0.48, 0.61, 0.88) and coordinates of the ground control center are (0, 0, 0).

When the artificial satellite receives the relative coordinates of each signal in the second target signal to the artificial satellite from the ground control center, the communication control apparatus of the artificial satellite may calculate (210.01°, 330.02°), (210.01°, 110.03°), (210.01°, 196.78°), or (210.01°, 44.8°) as the elevation angle and the azimuth angle of each signal using Mathematical Expression 1 to Mathematical Expression 5 based on the relative coordinates of each signal in the second target signal to the artificial satellite from the ground control center, as shown in FIG. 7B. At this time, the coordinates of the ground control center, as the origin, may be shifted to the point of the artificial satellite projected in the X-Y plane, all of the coordinates may be reset, and the elevation angle and the azimuth angle of each signal may be calculated. It can be seen that there is no great difference between the calculated elevation angle and azimuth angle of each signal and the elevation angle and the azimuth angle of each actual signal shown in Table 2, and therefore performance of the communication control apparatus of the artificial satellite is excellent.

When the artificial satellite receives the first target signal (θ=120°), the radiation angle beam pattern for the beamformer in the artificial satellite is as shown in FIG. 8A, and the spectrum for the output of the beamformer is as shown in FIG. 9A. In addition, when the artificial satellite receives the second target signal (θ=210°), the radiation angle beam pattern for the beamformer in the artificial satellite is as shown in FIG. 8B, and the spectrum for the output of the beamformer is as shown in FIG. 9B.

It can be seen from FIGS. 9A and 9B that the interference signals excluding the desired signal have been effectively removed.

FIG. 10 is a flowchart showing a communication control method of an artificial satellite according to an embodiment of the present disclosure.

Referring to FIG. 10, in step S1010, a communication control apparatus of the artificial satellite may receive location information of a signal generator on the ground from a ground control center. At this time, upon determining that a signal generated by the signal generator is an abnormal signal based on predetermined criteria, the communication control apparatus of the artificial satellite may receive the location information of the signal generator from the ground control center. The determination as to whether the signal is an abnormal signal may be made by, for example, the ground control center or the communication control apparatus of the artificial satellite.

As another example, before receiving the location information of the signal generator on the ground from the ground control center, the communication control apparatus of the artificial satellite may determine whether a signal detected in a predetermined area of interest of the artificial satellite is an abnormal signal based on the predetermined criteria, and upon determining that the detected signal is an abnormal signal, may request the location information of the signal generator, which is a signal source of the abnormal signal, from the ground control center, whereby the communication control apparatus of the artificial satellite may receive the location information of the signal generator on the ground from the ground control center.

Also, in the embodiment, the artificial satellite may be configured to communicate with a plurality of ground control centers. When the artificial satellite communicates with the plurality of ground control centers, the communication control apparatus of the artificial satellite may determine whether a signal detected in a predetermined area of interest of the artificial satellite is an abnormal signal based on the predetermined criteria. At this time, upon determining that the detected signal is an abnormal signal, the communication control apparatus of the artificial satellite may estimate a possible area in which a signal source of the detected signal may be located, and may request location information of the signal generator, which is the signal source of the abnormal signal, from a first ground control center that is located closest to the middle point of the area, among the plurality of ground control centers, whereby the communication control apparatus of the artificial satellite may receive the location information of the signal generator on the ground from the first ground control center.

As another example, when the artificial satellite communicates with the plurality of ground control centers, the communication control apparatus of the artificial satellite may determine whether a signal detected in a predetermined area of interest of the artificial satellite is an abnormal signal based on the predetermined criteria. At this time, upon determining that the detected signal is an abnormal signal, the communication control apparatus of the artificial satellite may estimate a possible area in which a signal source of the detected signal may be located, and may request location information of the signal generator, which is the signal source of the abnormal signal, and signal intensity information of the abnormal signal from a first ground control center that is located closest to the middle point of the area and a second ground control center that is located second closest to the middle point of the area, among the plurality of ground control centers, whereby the communication control apparatus of the artificial satellite may receive the location information of the signal generator and the signal intensity information of the abnormal signal from the first and second ground control centers.

In step S1020, the communication control apparatus of the artificial satellite may calculate an angle of arrival for a target signal from the signal generator, received by the artificial satellite, based on the location information of the signal generator and location information of the ground control center.

The angle of arrival for the target signal may be represented by an elevation angle θ and an azimuth angle ϕ for the target signal.

Here, the location information of the signal generator may include a first location within a two-dimensional coordinate system having the location of the ground control center as a first origin. At this time, the two-dimensional coordinate system may be a two-dimensional coordinate system having a line that joins the first origin and a projected point of the artificial satellite on the ground, which is the position at which the artificial satellite is projected onto the ground, as an X axis and a line perpendicular to the X axis on the ground as a Y axis.

Before calculating the angle of arrival for the target signal, the communication control apparatus of the artificial satellite may convert the first location into a second location within a three-dimensional coordinate system having the current projected point of the artificial satellite on the ground as a second origin based on the location information of the ground control center and the current location of the artificial satellite. Here, the three-dimensional coordinate system may be a three-dimensional coordinate system having a line that joins the current projected point of the artificial satellite on the ground and the location of the ground control center as an X axis, a line perpendicular to the X axis on the ground as a Y axis, and a line that joins the second origin and the artificial satellite as a Z axis.

The elevation angle for the target signal may be determined based on the distance between the artificial satellite and the second origin, the distance between the signal generator and the artificial satellite, and the distance between the signal generator and the projected point of the artificial satellite on the ground.

In order to calculate the elevation angle for the target signal, first, the communication control apparatus of the artificial satellite may calculate the distance $r_1$ between the artificial satellite and the second origin, the distance $r_2$ between the signal generator and the artificial satellite, and the distance $r_3$ between the signal generator and the projected point of the artificial satellite on the ground using Mathematical Expression 1.

The communication control apparatus of the artificial satellite may calculate the elevation angle θ (90 to 270) for the target signal based on the location information of the signal generator using Mathematical Expression 2, which is the second hyperbolic law of cosines, and Mathematical Expression 3.

In addition, the communication control apparatus of the artificial satellite may calculate the azimuth angle for the target signal. At this time, the communication control apparatus of the artificial satellite may calculate the azimuth angle using Mathematical Expression 4, which is the trigonometric ratio law, and Mathematical Expression 5.

In the embodiment, upon receiving the signal intensity information of the abnormal signal and the location information of the signal generator, which is the signal source of the abnormal signal, from the first ground control center and the second ground control center when the artificial satellite communicates with the plurality of ground control centers, the communication control apparatus of the artificial satellite may calculate the angle of arrival for the target signal from the signal generator, received by the artificial satellite, based on the received information. That is, the communication control apparatus of the artificial satellite may calculate the angle of arrival for the target signal using at least one of the location information of the signal generator received from the first ground control center and the location information of the signal generator received from the second ground control center based on the signal intensity information of the abnormal signal included in the information received from the first ground control center and the second ground control center. At this time, the communication control apparatus of the artificial satellite may calculate the angle of arrival for the target signal using the location information of the signal generator having greater signal intensity, which is one of the location information of the signal generator received from the first ground control center and the location information of the signal generator received from the second ground control center. Alternatively, when both the signal intensities of two pieces of the location information are equal to or greater than a critical value, the communication control apparatus of the artificial satellite may mix the two pieces of the location information with each other to determine the location information, and may calculate the angle of arrival for the target signal using the determined location information. In addition, when the signal intensity of one piece of the location information is less than the critical value, the communication control apparatus of the artificial satellite may calculate the angle of arrival for the target signal using the other piece of the location information.

In step S1030, the communication control apparatus of the artificial satellite may perform beamforming in a direction in which the artificial satellite detects the target signal based on the angle of arrival (e.g. the elevation angle and the azimuth angle).

The communication control apparatus of the artificial satellite may extract a desired signal from the target signal based on the angle of arrival. Specifically, when beamforming is performed in the direction in which the artificial satellite detects the target signal based on the angle of arrival, a beamformer in the artificial satellite may form a beam in a direction corresponding to the location information of the signal generator based on the angle of arrival, and the communication control apparatus of the artificial satellite may form a null in a direction different from the direction corresponding to the location information of the signal generator, whereby the communication control apparatus of the artificial satellite may remove an interference signal and noise from the target signal through the beamformer, thereby extracting a desired signal from the target signal. At this time, the beamformer in the artificial satellite is initially set to form a beam in a direction corresponding to the location of the stationary ground control center, the beamformer forms a beam in the direction corresponding to the location of the signal generator, and the communication control apparatus of the artificial satellite forms a null in the direction corresponding to the location of the ground control center. That is, the communication control apparatus of the artificial satellite may adjust the direction of the beam set to face the ground control center so as to face the signal generator.

As is apparent from the above description, according to embodiments of the present disclosure, it is possible for an artificial satellite to calculate an angle of arrival of a signal on the ground, received by the artificial satellite, based on location information of a signal source (a signal generator that generates a signal) received from a ground control center, instead of the artificial satellite directly detecting the signal in order to calculate the angle of arrival of the signal, whereby it is possible for the artificial satellite to easily recognize the angle of arrival of the signal on the ground.

According to embodiments of the present disclosure, it is possible for the artificial satellite to detect a signal on the ground based on the location information of the signal source (the signal generator that generates the signal) received from the ground control center upon determining that the signal generated on the ground is an abnormal signal, whereby it is possible for the artificial satellite to rapidly recognize an abnormal signal only when the abnormal signal is generated on the ground without continuously recognizing the signal on the ground.

According to embodiments of the present disclosure, it is possible for the artificial satellite to detect a signal on the ground based on the location information of the signal source received from the ground control center upon determining that a signal detected in a predetermined area of interest of the artificial satellite is an abnormal signal, whereby it is possible for the artificial satellite to monitor only a signal generated in a specific area on the ground.

In addition, according to embodiments of the present disclosure, it is possible for the artificial satellite to calculate an angle of arrival of a signal, received by the artificial satellite, based on location information of a signal source provided by each of a plurality of ground control centers and signal intensity information of the signal upon determining that a signal generated on the ground is an abnormal signal when the artificial satellite communicates with the plurality of ground control centers, whereby it is possible to improve accuracy of the angle of arrival.

As used in the present disclosure (particularly in the appended claims), the term "the" and similar demonstrative terms include both singular and plural references. Also, it should be understood that any numerical range recited herein is intended to include all sub-ranges subsumed therein (unless expressly indicated otherwise) and accordingly, the disclosed numerical ranges include every individual value between the minimum and maximum values of the numerical ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereto.

The present disclosure is thus not limited to the example embodiments described above, and rather intended to include the following appended claims, and all modifications, equivalents, and alternatives falling within the spirit and scope of the following claims.

What is claimed is:

1. An apparatus for controlling communication of an artificial satellite, the apparatus comprising:
   a processor;
   a memory operatively connected to the processor, the memory being configured to store at least one piece of code to be executed by the processor; and
   a transmission and reception interface configured to communicate with a ground control center, wherein
   the memory stores code enabling the processor:
   to receive location information of a signal generator on a ground from the ground control center;
   to calculate an angle of arrival for a target signal from the signal generator, received by the artificial satellite, based on the location information of the signal generator and location information of the ground control center; and
   to perform beamforming in a direction in which the artificial satellite detects the target signal based on the angle of arrival,
   when the code is executed by the processor,
   wherein:
   the location information of the signal generator comprises a first location within a two-dimensional coordinate system having a location of the ground control center as a first origin, and
   the two-dimensional coordinate system is a two-dimensional coordinate system having a line that joins the first origin and a projected point of the artificial satellite on the ground, which is a position at which the artificial satellite is projected onto the ground, as an X axis and a line perpendicular to the X axis on the ground as a Y axis.

2. The apparatus according to claim 1, wherein, upon determining that a signal generated by the signal generator is an abnormal signal based on a predetermined criterion, the transmission and reception interface receives the location information of the signal generator from the ground control center.

3. The apparatus according to claim 1, wherein the memory further stores code enabling the processor:
   to determine whether a signal detected in a predetermined area of interest of the artificial satellite is an abnormal signal based on the predetermined criterion; and
   upon determining that the detected signal is an abnormal signal, to request the location information of the signal generator, which is a signal source of the abnormal signal, from the ground control center.

4. The apparatus according to claim 1, wherein:
   the memory further stores code enabling the processor to convert the first location into a second location within a three-dimensional coordinate system having a current projected point of the artificial satellite on the ground as a second origin based on the location information of the ground control center and a current location of the artificial satellite, and
   the three-dimensional coordinate system is a three-dimensional coordinate system having a line that joins the current projected point of the artificial satellite on the ground and the location of the ground control center as an X axis, a line perpendicular to the X axis on the ground as a Y axis, and a line that joins the second origin and the artificial satellite as a Z axis.

5. The apparatus according to claim 4, wherein an elevation angle for the target signal is determined based on a distance between the artificial satellite and the second origin, a distance between the signal generator and the artificial satellite, and a distance between the signal generator and the projected point of the artificial satellite on the ground.

6. The apparatus according to claim 1, wherein:
   the artificial satellite is configured to communicate with a plurality of ground control centers, and
   the memory further stores code enabling the processor:
   to determine whether a signal detected in a predetermined area of interest of the artificial satellite is an abnormal signal based on a predetermined criterion; and
   upon determining that the detected signal is an abnormal signal, to estimate a possible area in which a signal source of the detected signal is located and to request the location information of the signal generator, which is the signal source of the abnormal signal, from a first ground control center that is located closest to a middle point of the area, among the plurality of ground control centers.

7. The apparatus according to claim 1, wherein:
   the artificial satellite is configured to communicate with a plurality of ground control centers, and
   the memory further stores code enabling the processor:
   to determine whether a signal detected in a predetermined area of interest of the artificial satellite is an abnormal signal based on a predetermined criterion;
   upon determining that the detected signal is an abnormal signal, to estimate a possible area in which a signal source of the detected signal is located and to request the location information of the signal generator, which is the signal source of the abnormal signal, and signal intensity information of the abnormal signal from a first ground control center that is located closest to a middle point of the area and a second ground control center that is located second closest to the middle point of the area, among the plurality of ground control centers; and
   to calculate the angle of arrival for the target signal using at least one of the location information of the signal generator received from the first ground control center and the location information of the signal generator received from the second ground control center based on the signal intensity information of the abnormal signal included in the information received from the first ground control center and the second ground control center.

8. The apparatus according to claim 1, wherein:
   the memory further stores code enabling a beamformer in the artificial satellite to form a beam in a direction corresponding to the location information of the signal generator based on the angle of arrival and enabling the processor to form a null in a direction different from the direction corresponding to the location information of the signal generator and to remove an interference signal and noise from the target signal through the beamformer, thereby extracting a desired signal from the target signal.

9. The apparatus according to claim 8, wherein:
the beamformer in the artificial satellite is initially set to form a beam in a direction corresponding to a location of the ground control center that is stationary, and
the memory further stores code enabling the beamformer to form a beam in the direction corresponding to the location of the signal generator and enabling the processor to form a null in the direction corresponding to the location of the ground control center.

10. A method for controlling communication of an artificial satellite, the method comprising:
receiving location information of a signal generator on a ground from a ground control center;
calculating an angle of arrival for a target signal from the signal generator, received by the artificial satellite, based on the location information of the signal generator and location information of the ground control center; and
performing beamforming in a direction in which the artificial satellite detects the target signal based on the angle of arrival,
wherein:
the location information of the signal generator comprises a first location within a two-dimensional coordinate system having a location of the ground control center as a first origin, and
the two-dimensional coordinate system is a two-dimensional coordinate system having a line that joins the first origin and a projected point of the artificial satellite on the ground, which is a position at which the artificial satellite is projected onto the ground, as an X axis and a line perpendicular to the X axis on the ground as a Y axis.

11. The method according to claim 10, wherein the receiving location information of a signal generator comprises, upon determining that a signal generated by the signal generator is an abnormal signal based on a predetermined criterion, receiving the location information of the signal generator from the ground control center.

12. The method according to claim 10, further comprising:
determining whether a signal detected in a predetermined area of interest of the artificial satellite is an abnormal signal based on the predetermined criterion; and
upon determining that the detected signal is an abnormal signal, requesting the location information of the signal generator, which is a signal source of the abnormal signal, from the ground control center.

13. The method according to claim 10, further comprising:
converting the first location into a second location within a three-dimensional coordinate system having a current projected point of the artificial satellite on the ground as a second origin based on the location information of the ground control center and a current location of the artificial satellite before the calculating an angle of arrival for a target signal, and
the three-dimensional coordinate system is a three-dimensional coordinate system having a line that joins the current projected point of the artificial satellite on the ground and the location of the ground control center as an X axis, a line perpendicular to the X axis on the ground as a Y axis, and a line that joins the second origin and the artificial satellite as a Z axis.

14. The method according to claim 13, wherein an elevation angle for the target signal is determined based on a distance between the artificial satellite and the second origin, a distance between the signal generator and the artificial satellite, and a distance between the signal generator and the projected point of the artificial satellite on the ground.

15. The method according to claim 10, wherein:
the artificial satellite is configured to communicate with a plurality of ground control centers, and
the method further comprises:
determining whether a signal detected in a predetermined area of interest of the artificial satellite is an abnormal signal based on a predetermined criterion; and
upon determining that the detected signal is an abnormal signal, estimating a possible area in which a signal source of the detected signal is located and requesting the location information of the signal generator, which is the signal source of the abnormal signal, from a first ground control center that is located closest to a middle point of the area, among the plurality of ground control centers.

16. The method according to claim 10, wherein:
the artificial satellite is configured to communicate with a plurality of ground control centers,
the method further comprises:
determining whether a signal detected in a predetermined area of interest of the artificial satellite is an abnormal signal based on a predetermined criterion; and
upon determining that the detected signal is an abnormal signal, estimating a possible area in which a signal source of the detected signal is located and requesting the location information of the signal generator, which is the signal source of the abnormal signal, and signal intensity information of the abnormal signal from a first ground control center that is located closest to a middle point of the area and a second ground control center that is located second closest to the middle point of the area, among the plurality of ground control centers, and
the calculating an angle of arrival for a target signal comprises calculating the angle of arrival for the target signal using at least one of the location information of the signal generator received from the first ground control center and the location information of the signal generator received from the second ground control center based on the signal intensity information of the abnormal signal included in the information received from the first ground control center and the second ground control center.

17. The method according to claim 10, wherein the performing beamforming comprises forming, by a beamformer in the artificial satellite, a beam in a direction corresponding to the location information of the signal generator based on the angle of arrival and forming a null in a direction different from the direction corresponding to the location information of the signal generator.

18. The method according to claim 17, wherein:
the beamformer in the artificial satellite is initially set to form a beam in a direction corresponding to a location of the ground control center that is stationary, and
the forming a null comprising forming a null in the direction corresponding to the location of the ground control center when the beamformer forms a beam in the direction corresponding to the location of the signal generator.

* * * * *